US012668373B2

(12) United States Patent
Heinisch et al.

(10) Patent No.: US 12,668,373 B2
(45) Date of Patent: Jun. 30, 2026

(54) SYSTEM FOR DETERMINING THE NUMBER OF PASSENGERS IN A VEHICLE, VEHICLE, AND METHOD FOR DETERMINING THE NUMBER OF PASSENGERS IN A VEHICLE

(71) Applicant: Airbus Operations GmbH, Hamburg (DE)

(72) Inventors: Matthias Heinisch, Hamburg (DE); Hans-Achim Bauer, Hamburg (DE); Michael Netzler, Hamburg (DE); Max Lange, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 112 days.

(21) Appl. No.: 18/458,336

(22) Filed: Aug. 30, 2023

(65) Prior Publication Data

US 2024/0076058 A1     Mar. 7, 2024

(30) Foreign Application Priority Data

Sep. 1, 2022    (EP) ..................................... 22193569

(51) Int. Cl.
| | |
|---|---|
| *G06V 20/59* | (2022.01) |
| *B64D 45/00* | (2006.01) |
| *G01S 13/88* | (2006.01) |
| *G06V 40/10* | (2022.01) |

(52) U.S. Cl.
CPC .......... *B64D 45/0056* (2019.08); *G01S 13/88* (2013.01); *G06V 20/59* (2022.01); *G06V 20/593* (2022.01); *G06V 40/10* (2022.01)

(58) Field of Classification Search
CPC .. B64D 45/0056; G01S 13/88; G06V 20/593; G06V 20/59; G06V 40/10
See application file for complete search history.

(56) References Cited

U.S. PATENT DOCUMENTS

| | | | |
|---|---|---|---|
| 2001/0029416 A1 | 10/2001 | Breed et al. | |
| 2008/0236275 A1 | 10/2008 | Breed et al. | |
| 2014/0327752 A1* | 11/2014 | Tsuda ................... | G06V 20/593 348/77 |

(Continued)

FOREIGN PATENT DOCUMENTS

| | | | |
|---|---|---|---|
| EP | 4001958 | * | 5/2022 |
| EP | 4001958 A1 | | 5/2022 |

OTHER PUBLICATIONS

European Search Report for corresponding European Patent Application No. 22193569 dated Feb. 21, 2023; priority document.

*Primary Examiner* — Steven Lim
(74) *Attorney, Agent, or Firm* — Greer, Burns & Crain, Ltd.

(57) ABSTRACT

A system for determining the number of passengers in a vehicle, comprising a plurality of sensors arranged to collect data concerning a cabin of the vehicle, wherein the plurality of sensors comprises at least one mm-wave-radar-sensor, and a computation unit, wherein the computation unit is connected to the plurality of sensors and configured to evaluate the data collected by the plurality of sensors in order to determine the number of passengers within the vehicle. Also provided is the vehicle with the system and a method for determining the number of passengers in the vehicle.

20 Claims, 4 Drawing Sheets

(56)        References Cited

U.S. PATENT DOCUMENTS

| | | | |
|---|---|---|---|
| 2015/0084317 A1* | 3/2015 | Togura | B60R 21/01532 |
| | | | 324/681 |
| 2020/0241529 A1* | 7/2020 | Salter | G06V 10/811 |
| 2020/0290567 A1* | 9/2020 | Funyak | B60R 25/102 |
| 2022/0111764 A1* | 4/2022 | Langridge | B60N 2/0025 |
| 2022/0388525 A1* | 12/2022 | Roberts | B60W 50/14 |
| 2025/0214632 A1* | 7/2025 | Puramana | B61L 15/009 |

* cited by examiner

10

100

SYSTEM FOR DETERMINING THE NUMBER OF PASSENGERS IN A VEHICLE, VEHICLE, AND METHOD FOR DETERMINING THE NUMBER OF PASSENGERS IN A VEHICLE

CROSS-REFERENCES TO RELATED APPLICATIONS

This application claims the benefit of the European patent application No. 22193569.5 filed on Sep. 1, 2022, the entire disclosures of which are incorporated herein by way of reference.

FIELD OF THE INVENTION

The present invention is directed to a system for determining the number of passengers in a vehicle, a vehicle, and a method for determining the number of passengers in a vehicle.

BACKGROUND OF THE INVENTION

The present invention will be discussed mainly in the context of commercial flight and associated aircraft. The present invention can however be applied to all fields in which multiple persons are transported with a singular vehicle, be it an aircraft, a train, a boat, or other.

In the context of commercial travel, there are numerous situations in which it is necessary to know the number of passengers present within the transportation vehicle. Such situations include, but are not limited to, routine boarding and deboarding procedures as well as evacuations in case of emergency.

The number of passengers in, for example, an aircraft is monitored by the cabin crew, for example by counting the number of passengers entering or exiting through doors in the cabin wall. The cabin crew is well trained and able to perform this task. However, in order to assist the cabin crew, automatic systems to determine the number of passengers in the aircraft would be advantageous.

Such automatic systems would use various sensors to provide data which would then be evaluated in order to determine the number of passengers within the aircraft. Various types of sensors, including but not limited to visual cameras, infrared sensors, and light-barrier-sensors, are already employed in aircraft and other transportation vehicles. However, each of these sensors comes with distinct characteristics which can hinder their performance in various circumstances. For example, visual cameras and infrared sensors can be obscured, for example by smoke. Light-barrier-sensors can provide erroneous data if multiple passengers pass through the light barrier in close proximity, for example if one passenger is carried by one or more other passengers.

SUMMARY OF THE INVENTION

In view of the above, it is an objective of the present invention to provide improved automated systems and method for determining the number of passengers in a vehicle.

To that effect, a first aspect of the invention provides a system for determining the number of passengers in a vehicle. The system comprises a plurality of sensors arranged to collect data concerning a cabin of the vehicle, wherein the plurality of sensors comprises at least one mm-wave-radar-sensor, and a computation unit, wherein the computation unit is connected to the plurality of sensors and configured to evaluate the data collected by the plurality of sensors in order to determine the number of passengers within the vehicle.

A further aspect of the invention provides a vehicle, in particular an aircraft, comprising a system according to the present invention.

A further aspect of the invention provides a method for determining the number of passengers in a vehicle. Data concerning a cabin of the vehicle is collected by a plurality of sensors, wherein the plurality of sensors comprises at least one mm-wave-radar sensor, and the data collected by the plurality of sensors is evaluated by a computation unit in order to determine the number of passengers within the vehicle.

The applicant performed research in using mm-wave-radar-sensors in the context of monitoring passengers within a cabin of an aircraft. Mm-wave-radar-sensors emit electromagnetic signals with a wavelength in the mm range and use received reflections of the signals to identify objects, their location and movement. Generally speaking, the only objects moving within an aircraft cabin are the cabin crew, passengers, and other objects closely associated with either, for example luggage. Data provided by mm-wave-radar-sensors can therefore be used to identify passengers within an aircraft, in particular in situations where passengers are in motion, for example when entering or exiting the aircraft. Mm-wave-radar-sensors provide the advantage that obstruction obscuring the function of other sensors like visual cameras and infrared sensors, for example smoke, are transparent to mm-wave-radar-sensors which can therefore function unimpeded under such circumstances. The research performed by the applicant has also shown that singular mm-wave-radar-sensors still face some challenges at the moment as with the computing power presently available, the data generated by a singular mm-wave-radar-sensor cannot always provide an accurate reflection of the real situation under all circumstances.

One idea of the present invention lies therefore in combining the data generated by multiple sensors, one of which is a mm-wave-radar-sensor, to improve the evaluation process used to determine the number of passengers in a vehicle from the data generated by each sensor individually. Through correct positioning of sensors and/or combining different types of sensors, the flaws of one singular sensor can be compensated by the other sensors leading to an overall improved performance of the automatic determination of the number of passengers within the vehicle.

According to an embodiment of the system, at least one of the plurality of sensors, in particular of the at least one mm-wave-radar-sensors, is arranged on a ceiling of the cabin. This position can provide an advantageously complete view of large portions of the cabin at once.

According to a further embodiment of the system, at least one of the plurality of sensors, in particular of the at least one mm-wave-radar sensors, is arranged on a wall of the cabin. This positioning can provide an advantageously direct view of selected parts of the cabin and, depending on the type of sensor, can reduce the impact of reflection artifacts within the data generated.

According to a further embodiment of the system, at least one of the plurality of sensors, in particular of the at least one mm-wave-radar-sensors, is arranged in proximity to a door in the cabin wall, in particular above the door. As the number of passengers in the vehicle can only change through passengers passing through a door in the cabin wall, monitoring the space in the vicinity of such a door provides advantageously robust data for determining the number of passengers in the vehicle.

According to an advantageous embodiment, the at least one of the plurality of sensors is arranged to collect data concerning at least one of the interior side or the exterior side of the door. Passengers passing through a door have to pass through the space directly inside and outside the door, meaning that monitoring these spaces provides particularly robust results when determining the number of passengers in the vehicle.

According to a further embodiment of the system, a plurality of sensors are arranged in sub-groups of at least two sensors, wherein the sensors of each sub-groups are arranged to collect data concerning a shared portion of the cabin. Such sub-groups can provide a particularly advantageous method of evaluating the data provided by the sensors in these sub-groups.

According to an advantageous embodiment, each sub-group comprises two sensors arranged opposite to each other on opposite walls of the cabin. In this case, the sensors monitor the same space within the cabin and their data can be evaluated in a particularly advantageous combination.

According to a further embodiment, the plurality of sensors comprises at least one of a camera, an infrared sensor, a light-barrier-sensor, or a weight sensor. Depending on circumstances, each of these sensor types can provide advantageously suited data for determining the number of passengers in the vehicle.

According to a further embodiment of the system, the computation unit is further configured to evaluate the data generated by the plurality of sensors in order to determine positions of passengers within the vehicle. Determining the positions of passengers provides further information which can be advantageously used when determining the number of passengers in the vehicle.

According to a further embodiment, the system further comprises at least one display unit connected to the computation unit and configured to display the results of the data evaluation performed by the computation unit. This advantageously allows a display of the results of the data evaluation to personnel which need to know the number of passengers in the vehicle to perform their duties, in particular to the cabin crew.

According to a further embodiment of the method, according the evaluating of data collected by the plurality of sensors comprises an identifying and synchronizing of passengers within the data collected by at least one of the plurality of sensors. Using multiple sensors in conjunction to identify individual passengers allows for a particularly robust evaluation of the data to determine the number of passengers in the vehicle.

According to a further embodiment of the method, the evaluating of data collected by at least one of the plurality of sensors takes into account the data collected by different ones of the plurality of sensors. Depending on the situation, some sensors might provide more robust data than others. Prioritizing these sensors can improve the results of the data evaluation to determine the number of passengers in the vehicle.

The above embodiments and further developments can be combined with each other as desired, if useful. Further possible embodiments, further developments and implementations of the invention also comprise combinations of features of the invention described above or below with respect to the embodiments which are not explicitly mentioned. In particular, the person skilled in the art will also add individual aspects as improvements or additions to the respective basic form of the present invention.

BRIEF DESCRIPTION OF THE DRAWINGS

The present invention is explained in more detail below with reference to the embodiments shown in the schematic figures.

The accompanying figures are intended to provide a further understanding of embodiments of the invention. They illustrate embodiments and, in connection with the description, serve to explain principles and concepts of the invention. Other embodiments and many of the advantages mentioned will be apparent with reference to the drawings. The elements of the drawings are not necessarily shown to scale with respect to each other.

In the figures of the drawings, identical elements, features and components that have the same function and the same effect are each given the same reference signs, unless otherwise specified.

DETAILED DESCRIPTION OF THE PREFERRED EMBODIMENTS

Figure 1:
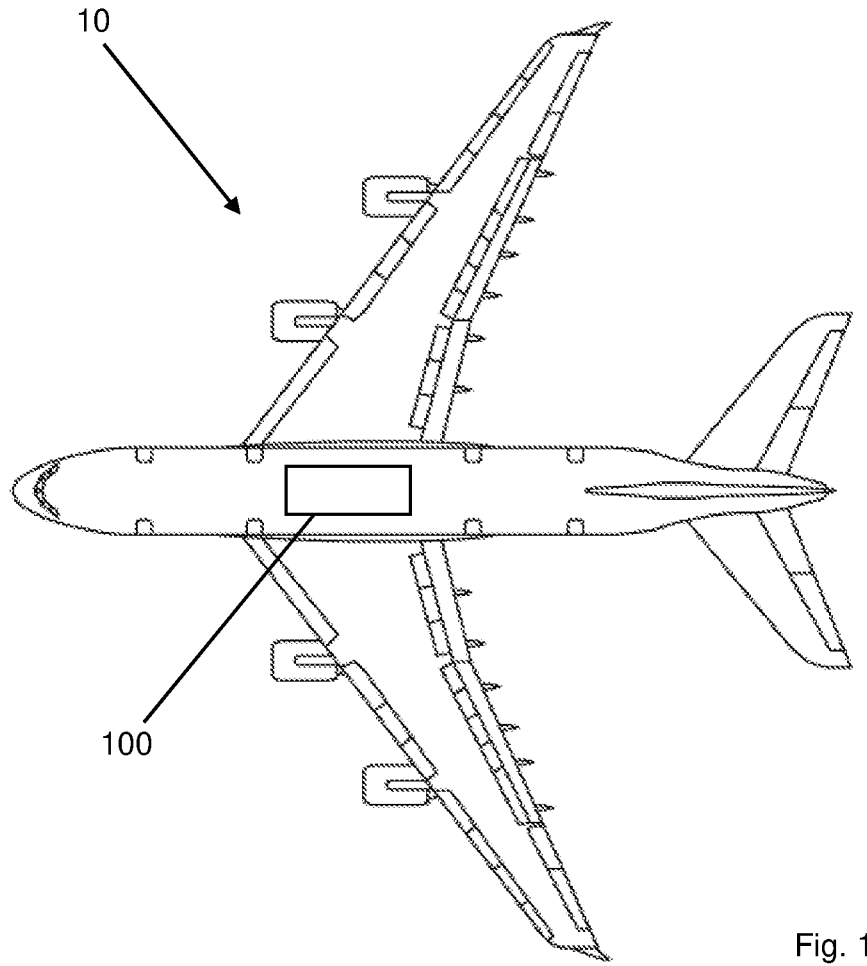
FIG. 1 shows a schematic illustration of an aircraft according to an embodiment of the present invention.

FIG. 1 shows a schematic illustration of an aircraft 10 according to an embodiment of the present invention. In place of the aircraft 10 shown, any other mass transportation vehicle falls under the scope of the present invention.

The aircraft 10 comprises a system 100 for determining the number of passengers in the aircraft 10. The features and functions of the system 100 will be explained in further detail in the context of FIGS. 2 to 4.

Figure 2:
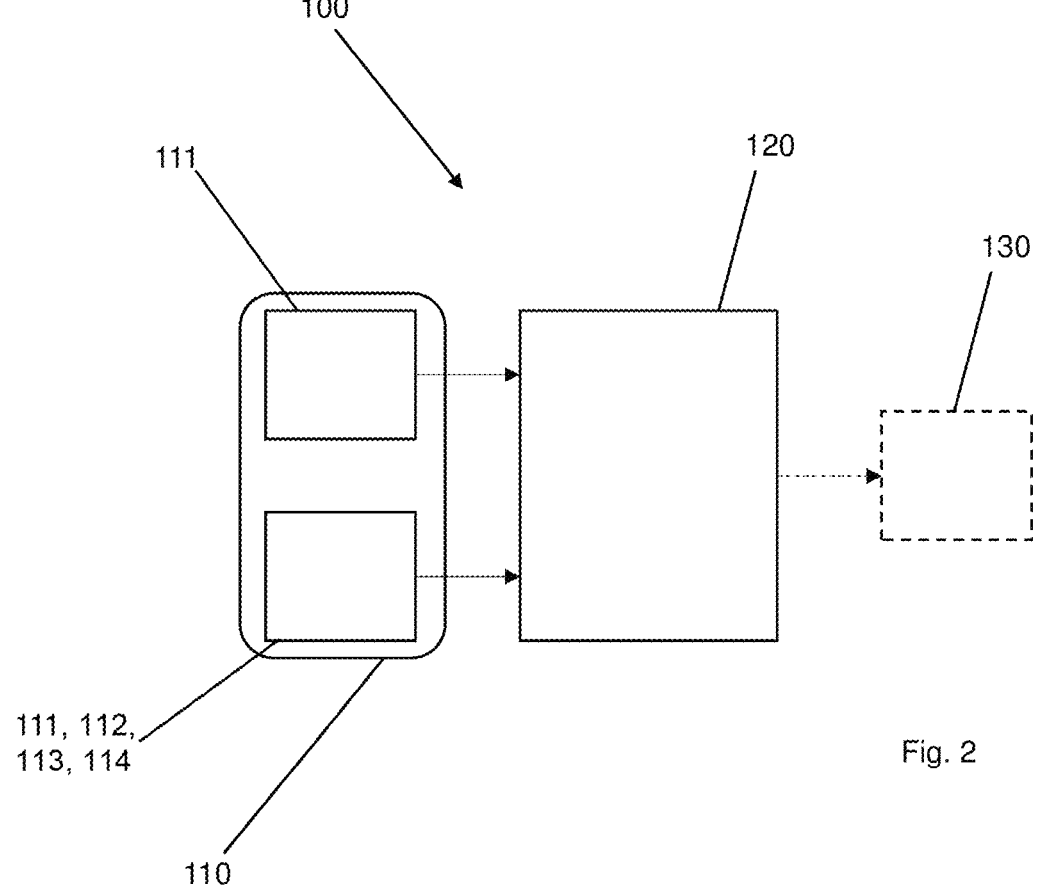
FIG. 2 shows a schematic illustration of a system for determining the number of passengers in an aircraft according to an embodiment of the present invention.

FIG. 2 shows a schematic illustration of a system 100 for determining the number of passengers in an aircraft according to an embodiment of the present invention.

The system 100 comprises a plurality of sensors 110 and a computation unit 120. The plurality of sensors 110 comprises two sensors, one of which is a mm-wave-radar-sensor 111. The plurality of sensors 110 are connected to the computation unit 120. An optional display unit 130 and its connection to the computation unit 120 are shown with dashed lines.

The plurality of sensors 110 are configured to collect data concerning a cabin of an aircraft. Through the connection between the plurality of sensors 110 and the computation unit 120, the collected data can be transferred to the computation unit 120, which is configured to evaluate the collected data in order to determine the number of passengers in the aircraft. This process will later be explained in more detail in the context of FIG. 4.

The optional display unit 130 preferably comprises a visual display for displaying the results of the evaluation performed by the computation unit 120. Additionally or alternatively, the display unit 130 can be configured to provide audio cues concerning the results of the data evaluation, for example the display unit 130 can provide an audio signal if the data evaluation determines that no passengers remain in the aircraft. The system 100 can comprise more than one display unit 130. The display unit 130 can be installed at a fixed location within the aircraft. Additionally or alternatively, the display unit 130 can comprise a mobile device, in particular it can comprise a mobile device associated and in the possession of a member of the cabin crew. If more than one display unit 130 is provided, each member of the cabin crew can be in possession of such a mobile device.

In FIG. 2, the plurality of sensors 110 comprises two sensors, one of which is explicitly a mm-wave-radar sensor 111. The other sensor can also be a mm-wave-radar sensor or can be a different type of sensor, in particular a camera, an infrared sensor, or a light-barrier-sensor. Other numbers and combinations of sensors fall under the scope of the present invention, in particular, all sensors of the plurality of sensors 110 can be mm-wave-radar-sensors, independent of the number of sensors constituting the plurality of sensors. One exemplary embodiment of such a plurality of sensors will be explained in further detail in the context of FIG. 3.

Figure 3:
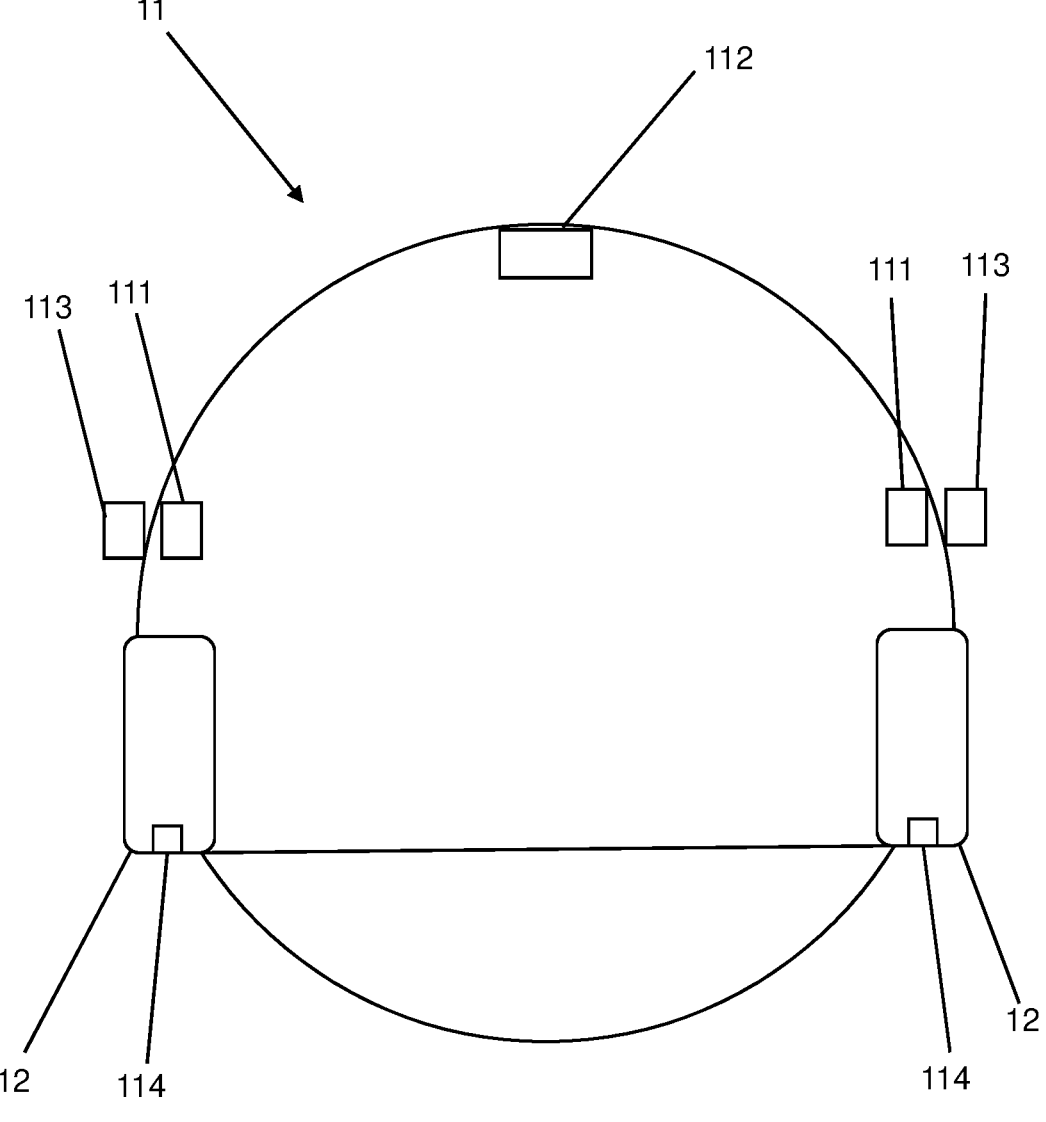
FIG. 3 shows a schematic illustration of a cabin of an aircraft according to an embodiment of the present invention.

FIG. 3 shows a schematic illustration of a cabin 11 of an aircraft according to an embodiment of the present invention.

The cabin 11 is shown in profile. The aircraft comprises two doors 12, integrated into opposite walls of the cabin 11. Two mm-wave-radar-sensors 111 are arranged on interior sides of opposite walls of the cabin 11, above the respective doors 12. A camera 112 is arranged on a ceiling of the cabin. Two infrared sensors 113 are arranged on exterior sides of opposite walls of the cabin 11, above the respective doors 12. Two light-barrier-sensors 114 are arranged in the frames of the respective doors 12.

The mm-wave-radar-sensors 111, the infrared sensors 113, and the light-barrier-sensors 114, are all located in proximity to the doors 12. As the number of passengers in the aircraft can only change by passengers entering or exiting through one of the doors 12, collecting data concerning the vicinity of the doors 12 can provide the most reliable information in order to determine the number of passengers in the aircraft.

The mm-wave-radar-sensors 111 are located above the doors 12 and monitor the interior of the cabin 11. Passengers entering or exiting the aircraft will generally move away or towards the doors 12 respectively with only a minimum amount of lateral movement regarding the doors 12. Under these circumstances, the mm-wave-radar-sensors 111 can be particularly well suited to identify passengers within the aircraft.

The camera 112 is arranged on a ceiling of the cabin 11. Although the profile perspective of FIG. 3 shows the camera in the same plane as the doors 12, the camera 112 can be located at any point within the cabin 11. The location at the ceiling of the cabin 11 gives the camera 112 a particularly good vantage point, as there should only be minimal obstruction between the camera 112 and the parts of the cabin 11 where passengers can be located. The camera 112 can, in particular, comprise a fisheye lens, giving a camera an advantageously wide field of view. Additionally or alternatively, a mm-wave-radar-sensor can be provided at the location of the camera 112.

Infrared sensors 113 are arranged above the doors 12 monitoring the exterior of the aircraft in close proximity to the doors 12. As humans generally have a higher body temperature than the ambient environment, the infrared sensors 113 can be particularly well suited to identifying passengers outside the aircraft, even when visual obstructions, for example vegetation or rocks, are present in the vicinity of the aircraft. Additionally or alternatively, further mm-wave-radar-sensors can be located at the positions of the infrared sensors 113. As passengers generally exit the doors 12 and subsequently move away from the aircraft in essentially a straight line, mm-wave-radar-sensors can be particularly well suited of identifying passengers under these circumstances.

Light-barrier-sensors 114 are arranged in the frames of the doors 12. Passengers crossing through the door, either entering or exiting, momentarily interrupt the light barrier, which can therefore determine when at least one passenger has entered or exited the aircraft. This information is particularly well suited to allow a computation unit to correctly evaluate the data provided by the other sensors. Additionally or alternatively, a weight sensor can be provided at the location of the light-barrier-sensors 114 to detect passengers passing through the door.

Figure 4:
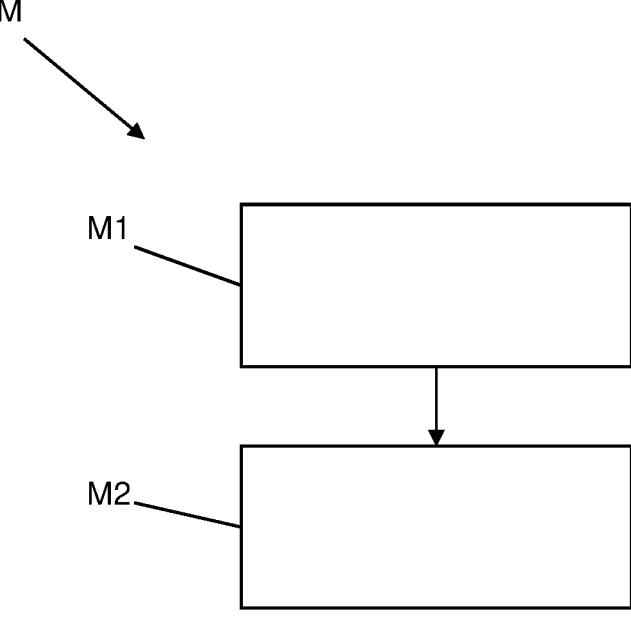
FIG. 4 shows a schematic flow diagram of a method for determining the number of passengers in an aircraft according to an embodiment of the present invention.

FIG. 4 shows a schematic flow diagram of a method M for determining the number of passengers in an aircraft according to an embodiment of the present invention.

In a first method step M1, data concerning a cabin of the aircraft is collected by a plurality of sensors. In a second method step M2, the data collected by the plurality of sensors is evaluated by a computation unit in order to determine the number of passengers within the aircraft. According to the present invention, the plurality of sensors collecting the data in method step M1 comprises at least one mm-wave-radar-sensor.

Each of the plurality of sensors provides its own set of data concerning the cabin of the aircraft which the computation unit can evaluate, on its own or in combination to determine the number of passengers in the aircraft. Additionally, the computation unit can also evaluate the data provided by the plurality of sensors to determine the positions of passengers within the aircraft.

Depending on the type of sensor, the data of the respective sensor can be used to individually identify passengers and additionally their respective positions. In particular, this is possible with the data provided by the at least one mm-wave-sensor. Other sensor types which can provide data concerning individual passengers include visual cameras and infrared sensors. As multiple sets of data are available, results of evaluating one set of data can be used to refine the results obtained by evaluating another set of data. For example, if evaluating the data provided by a mm-wave-radar-sensor is inconclusive as to whether one or two passengers are located at a certain position, data provided by, for example, a visual camera can be used to resolve this uncertainty. In another example, if a light-barrier-sensor indicates that a passenger has passed through a door in a cabin wall, it can be determined whether a set of data points provided by a mm-wave-radar-sensor associated with said door indicates the presence of a passenger or of a different obstruction.

For this evaluation, all sensors can be treated equivalently, with all sensor data being initially processed separately and the final determination of the number and positions of passengers in the aircraft taking all sensors into account with equal weight. Depending on the situation, it can be advantageous to prioritize the data provided by some sensors over others when the initial data processing produces conflicting results. For example, the indication that a passenger has passed through a door provided by light-barrier sensor can be given priority over an indication that the passenger is still within the field of view of a corresponding mm-wave-radar-sensor. In another example, the indications of passengers provided by a mm-wave-radar-sensor can be given priority over conflicting indications provided by a camera if obscuring features, for example smoke, are present within the cabin which inhibit the function of the camera but not of the mm-wave-radar-sensor.

It can also be advantageous to group the sensors into sub-groups and evaluate the data provided by the sensors in such a sub-group in conjunction. Referring to FIG. 3, the mm-wave-radar sensors 111 can be grouped together, as they are monitoring the same space within the cabin, albeit from different perspectives. In this case, every passenger within the field of view of one mm-wave-radar-sensor 111 should also be in the field of view of the other mm-wave-radar-sensor. The data provided by both mm-wave-radar-sensors 111 combined therefore provides more robust information with which to determine the number and positions of passengers within the space monitored by the mm-wave-radar-sensors 111. Additionally or alternatively, the mm-wave-radar-sensors 111 could be grouped together with the infrared sensors 113 and/or the light-barrier-sensors 114 associated with their respective door 12. As every passenger identified as passing through the door 12 by the mm-wave-radar-sensor 111 should be identified immediately before or after by the respective infrared sensor 113 of light-barrier-sensor 114, the combination of these data sets provides more robust information with which to determine whether a passenger has passed through the door 12. Such sub-groups can be exclusive, meaning every sensor is associated with only one sub-group. However, it is also possible that any given sensor is associated with more than one sub-group. It is not necessary that every sensor be associated with such a sub-group. For example, the camera 112 shown in FIG. 3 can be associated with no sub-group.

The simultaneous and synchronized acquisition of data by the various types of sensors, as shown in the exemplary embodiments of the drawings, provides especially robust results when determining the number of passengers in the aircraft. For example, some sensors, like mm-wave-radar-sensors, provide data that makes it difficult to differentiate pieces of luggage and passengers in a low position, like crawling on the floor. Other sensors, like infrared-sensors, provide data in which this differentiation is particularly easy. Combining these types of sensor in a synchronized manner, greatly enhances the overall results when determining the number of passengers in the aircraft.

The systems and devices described herein may include a controller, control unit, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
11 cabin
12 door
100 system
110 plurality of sensors
111 mm-wave-radar-sensor
112 camera
113 infrared sensor
114 light-barrier sensor 120 computation unit
130 display unit
M method
M1 method step of collecting data
M2 method step of evaluating data

The invention claimed is:

1. A system for determining a number of passengers in a vehicle, comprising:

a plurality of sensors arranged to collect data concerning a cabin of the vehicle, wherein the plurality of sensors comprises at least a first sensor being a mm-wave-radar-sensor arranged at a first position inside the cabin to measure a first value corresponding to an interior cabin condition and a second sensor being a sensor different than the first sensor arranged at a second position outside of the cabin to measure a second value different from the first value corresponding to an exterior cabin condition; and a computation unit, wherein the computation unit is connected to the plurality of sensors and configured to evaluate the data collected by the plurality of sensors in order to determine the number of passengers within the vehicle, and wherein the computation unit compares the data collected by the first sensor and the data collected by the second sensor to determine an accuracy of the determination of the number of passengers within the vehicle.

2. The system according to claim 1, wherein at least one mm-wave-radar-sensor is arranged on a ceiling of the cabin.

3. The system according to claim 1, wherein at least one mm-wave-radar sensor is arranged on a wall of the cabin.

4. The system according to claim 3, wherein at least one mm-wave-radar-sensor is arranged in proximity to a door in the cabin wall.

5. The system according to claim 4, wherein at least one mm-wave-radar-sensor is arranged above the door.

6. The system according to claim 4, wherein at least one mm-wave-radar-sensor is arranged to collect data concerning at least one of the interior side or the exterior side of the door.

7. The system according to claim 1, wherein the plurality of sensors are arranged in sub-groups of at least two sensors, wherein the sensors of each sub-group are arranged to collect data concerning a shared portion of the cabin.

8. The system according to claim 7, wherein each sub-group comprises two sensors arranged opposite to each other on opposite walls of the cabin.

9. The system according to claim 1, wherein the plurality of sensors comprises at least one of a camera, an infrared sensor, a light-barrier-sensor, or a weight sensor.

10. The system according to claim 1, wherein the computation unit is further configured to evaluate the data generated by the plurality of sensors in order to determine positions of passengers within the vehicle.

11. The system according to claim 1, further comprising at least one display unit connected to the computation unit and configured to display results of a data evaluation performed by the computation unit.

12. A vehicle comprising a system according to claim 1.

13. The vehicle according to claim 12, wherein the vehicle is an aircraft.

14. A method for determining a number of passengers in a vehicle, wherein the method comprises:

collecting data concerning a cabin of the vehicle by a plurality of sensors, wherein the plurality of sensors comprises at least a first sensor being a mm-wave-radar sensor arranged at a first position inside the cabin to measure a first value corresponding to an interior cabin condition and a second sensor being a sensor different than the first sensor arranged at a second position outside of the cabin to measure a second value different from the first value corresponding to an exterior cabin condition;

evaluating the data collected by the plurality of sensors with a computation unit in order to determine the number of passengers within the vehicle; and determining an accuracy of the determination of the number of passengers within the vehicle by comparing the data collected by the first sensor and the data collected by the second sensor.

15. The method according to claim 14, wherein the evaluating of data collected by the plurality of sensors comprises an identifying and synchronizing of passengers within the data collected by at least one of the plurality of sensors.

16. The method according to claim 14, wherein the evaluating of data collected by at least one of the plurality of sensors takes into account the data collected by different one of the plurality of sensors.

17. The system according to claim 1, wherein the computation unit applies a weight to at least one of the first sensor or the second sensor prior to comparing the first sensor and the second sensor.

18. The system according to claim 1, wherein the plurality of sensors further includes:

at least a third sensor being a camera arranged at a third position inside the cabin to measure a third value corresponding to the interior cabin condition; and at least a fourth sensor being a light-barrier sensor arranged at a threshold of a door in a wall of the cabin to measure a fourth value corresponding to a threshold cabin door condition.

19. The system according to claim 18, wherein:

the first value is selected from a group consisting of a position of a passenger of the number of passengers, a speed of the passenger, a relative distance of the passenger from the first sensor, or any combination thereof;

the second value includes an infrared reading outside of the aircraft;

the third value includes an image of an interior of the cabin; and the fourth value includes a light intensity reading at the threshold of the cabin door.

20. The system according to claim 18, wherein the plurality of sensors includes:

at least two of the first sensors each arranged on opposite sides of the cabin interior;

at least two of the second sensors each arranged on opposite sides of the cabin exterior; and at least two of the fourth sensors, at least one of the fourth sensors arranged at every door of the aircraft.

* * * * *